(12) United States Patent
Deppe et al.

(10) Patent No.: US 10,052,975 B2
(45) Date of Patent: Aug. 21, 2018

(54) SEAT CUSHION LENGTH ADJUSTING DEVICE AND METHOD OF ADJUSTING A SEAT CUSHION LENGTH

(71) Applicant: Schukra Gerätebau GmbH, Berndorf (AT)

(72) Inventors: Rüdiger Deppe, Lenting (DE); Martin Fritzsche, Gräfenberg (DE); Klaus Junker, Diessen am Ammersee (DE); Gunter Maierhofer, Vietsbronn (DE)

(73) Assignee: SCHUKRA GERAETEBAU GMBH, Berndorf (AT)

( * ) Notice: Subject to any disclaimer, the term of this patent is extended or adjusted under 35 U.S.C. 154(b) by 32 days.

(21) Appl. No.: 15/113,733

(22) PCT Filed: Jan. 31, 2014

(86) PCT No.: PCT/EP2014/051956
§ 371 (c)(1),
(2) Date: Jul. 22, 2016

(87) PCT Pub. No.: WO2015/113633
PCT Pub. Date: Aug. 6, 2015

(65) Prior Publication Data
US 2017/0136919 A1    May 18, 2017

(51) Int. Cl.
*B60N 2/02* (2006.01)
(52) U.S. Cl.
CPC ......... *B60N 2/0284* (2013.01); *B60N 2/0232* (2013.01); *B60N 2002/0236* (2013.01)

(58) Field of Classification Search
CPC ................ B60N 2/0284; B60N 2/0232; B60N 2002/0236
See application file for complete search history.

(56) References Cited

U.S. PATENT DOCUMENTS

2007/0090673 A1    4/2007  Ito
2008/0174162 A1*   7/2008  Becker ................ B60N 2/0284
                                                297/311
(Continued)

FOREIGN PATENT DOCUMENTS

CN    102092325 A    6/2011
CN    103209859 A    7/2013
(Continued)

OTHER PUBLICATIONS

International Search Report and Written Opinion, received in International Patent Application No. PCT/EP2014/051956, dated Aug. 7, 2014 (10 pages).

*Primary Examiner* — Philip F Gabler
(74) *Attorney, Agent, or Firm* — Michael Best & Friedrich LLP

(57) ABSTRACT

A seat cushion length adjusting device comprises a support, an adjusting member displaceably mounted to the support and configured for attachment to at least a portion of a seat cushion, and an actuator. The actuator is coupled to the support and the adjusting member. The actuator is configured to displace the adjusting member relative to the support. The actuator comprises a power drive, a speed reduction gearing, and a motion conversion mechanism for converting a rotational motion of an output of the speed reduction gearing into a linear displacement between the adjusting member and the support.

12 Claims, 9 Drawing Sheets

(56) References Cited

U.S. PATENT DOCUMENTS

| | | | | |
|---|---|---|---|---|
| 2009/0152920 A1* | 6/2009 | Gumbrich | ............ | B60N 2/0232 |
| | | | | 297/284.1 |
| 2011/0115268 A1 | 5/2011 | Maierhofer et al. | | |
| 2013/0341982 A1* | 12/2013 | Maierhofer | ............ | A47C 7/465 |
| | | | | 297/284.4 |
| 2015/0352980 A1* | 12/2015 | Rehfuss | ............... | B60N 2/0232 |
| | | | | 297/284.11 |

FOREIGN PATENT DOCUMENTS

| | | |
|---|---|---|
| DE | 102 27 730 C1 | 8/2003 |
| DE | 103 08 397 B3 | 4/2004 |
| DE | 10 2010 042880 A1 | 5/2012 |
| JP | S59-117539 | 8/1984 |
| JP | 2005-067434 | 3/2005 |
| KR | 10-2012-0092665 | 8/2012 |
| WO | 2011/057694 A1 | 5/2011 |

* cited by examiner

SEAT CUSHION LENGTH ADJUSTING DEVICE AND METHOD OF ADJUSTING A SEAT CUSHION LENGTH

TECHNICAL FIELD

Embodiments of the invention relate to an adjusting device for a seat. Embodiments of the invention relate in particular to an adjusting device for adjusting a seat cushion using a power drive.

BACKGROUND

A wide variety of seats is provided with components which allow at least a portion of the seat to be adjusted. Examples for such adjustable portions include adjustable lumbar supports, adjustable side supports or various massage functions. Seats which provide a user with the option to adjust at least a portion of the seat are used to provide enhanced comfort. This may be of particular importance when a user may be likely to sit on the seat for an extended time period. A typical example is a seat for use in transportation, e.g. a car seat or another vehicle seat. For illustration, for car seats, bus seats or other public transportation seats, the seat occupant may spend an extended time period sitting on the respective seat.

In order to accommodate different passenger sizes, it is desirable to provide a seat which allows a seat cushion size to be adjusted. This can be attained by increasing and/or decreasing a length of a seat cushion. The seat cushion upon which the user's thighs rest may thereby be adjusted in its length, measured along the forward-rearward direction of the seat, for example.

Motor-driven adjusting devices offer various advantages over manual adjustment devices. User comfort may be enhanced. Motor-driven adjusting devices also provide an electric interface which lends itself to automation, e.g. under the control of a controller of a vehicle which may automatically control the motor to bring the seat to a desired state. In spite of the benefits offered by motor-driven adjusting devices, packaging is an issue in many seats. In vehicle seats, it may be desired that a large number of components can be integrated into the seat to provide various comfort functions, such as adjustable side support in combination with seat cushion length adjustment. The size and weight of a motor used in conventional seat adjusting devices may add to the size and weight of the seat. Conventional motor-driven adjusting devices may also be complex to install and may not be configured to allow the characteristics of the adjusting device to be easily adapted to different customer needs. The resulting workload increases the costs of the seat. The construction of conventional adjusting devices, which may be based on fairly rigid and sturdy linear actuators, may be prone to breakage under the loads encountered in seating, e.g. in a vehicle seat.

SUMMARY OF THE INVENTION

There is a need in the art for an improved adjusting device for adjusting a length of a seat cushion. In particular, there is a need in the art for a seat cushion length adjusting device which has a compact construction. There is a need in the art for a seat cushion length adjusting device which can be easily mounted to a seat, e.g. a vehicle seat.

According to embodiments of the invention, a seat cushion length adjusting device and a method of adjusting a length of a seat cushion as defined in the independent claims are provided. Further, a seat comprising a seat cushion length adjusting device is provided. The dependent claims define embodiments.

A seat cushion length adjusting device according to an embodiment comprises a support, an adjusting member, and an actuator. The adjusting member is displaceably mounted to the support and configured for coupling to at least a portion of a seat cushion. The actuator is coupled to the support and the adjusting member. The actuator is configured to displace the adjusting member relative to the support. The actuator comprises a power drive, a speed reduction gearing having an input coupled to the power drive and an output, and a motion conversion mechanism for converting a rotational motion of the output of the speed reduction gearing into a linear displacement between the adjusting member and the support.

The seat cushion length adjusting device can be installed in a compact installation space. The speed reduction gearing acts as a torque increase gearbox. This allows a compact and light-weight electric motor to be used as a power drive.

The support may be configured for attachment to a seat pan. The support may be a section of the seat pan.

The motion conversion mechanism may comprise a spindle drive. Thereby, a linear actuation for adjusting a length of the seat cushion may be implemented in a compact installation space.

The spindle drive may comprise a spindle having an external thread. The spindle drive may comprise a spindle nut having an internal thread engaged with the external thread of the spindle.

The spindle may be a flexible spindle. Thereby, the risk of failure may be mitigated while accommodating the loads which may occur in seating applications.

The spindle may be a flexible spindle which deforms elastically when axial loads less than an axial load of 1200 N are applied.

The spindle may comprise a core and a wire helix wound about the core to form the external thread. Such a spindle provides good durability while providing resilient characteristics under both axial and transverse loads.

The core may comprise a cable formed from a plurality of metal wires. Such a spindle provides good durability while providing resilient characteristics under both axial and transverse loads.

The spindle may be mounted such that it is secured against rotation. The spindle may be mounted on the adjusting member so as to be displaceable relative to the support jointly with the adjusting member. The spindle nut may be mounted so as to be rotatable. The spindle nut may be mounted to the support. The spindle nut may be rotatably supported in a housing of the actuator which also houses the power drive and the speed reduction gearing. Thereby, a compact and modular design which lends itself to easy installation is attained.

The spindle nut may be mounted such that it is secured against rotation. The spindle nut may be mounted on the adjusting member so as to be displaceable relative to the support jointly with the adjusting member. The spindle may be mounted so as to be rotatable. The spindle may be mounted to the support. The spindle may be rotatably supported in a housing of the actuator which also houses the power drive and the speed reduction gearing. Thereby, a modular design which lends itself to easy installation is attained.

When the spindle is rotatably mounted, the spindle may have an overmolding which is integrally formed with the output of the speed reduction gearing. The output may be a worm gear of the speed reduction gearing.

When the spindle nut is rotatably mounted, the spindle nut may be integrally formed with the output of the speed reduction gearing. The output may be a worm gear of the speed reduction gearing.

Irrespective of whether the spindle or the spindle nut is rotatably mounted, the spindle may comprise an end stop molded onto the spindle. The end stop may be formed from plastic. The end stop may have an abutment surface. Abutment of the spindle nut or of an actuator housing on the abutment surface of the end stop may define an end position for the displacement of the adjusting member relative to the support. Travel of the adjusting member relative to the support may thereby be limited in a cost-efficient way.

The end stop may further comprise an attachment feature for attachment of the spindle.

For a spindle which is rotatably mounted, the attachment feature may be configured for rotatably mounting the spindle to the support or to the adjusting member.

For a spindle which is mounted so as to be secured against rotation, the attachment feature may be configured for attaching the spindle to the support or to the adjusting member so as to prevent rotation of the spindle about its longitudinal axis. The attachment feature may be configured to permit a pivoting movement or a deflection of the spindle about an axis which is transverse to a longitudinal axis of the spindle.

The motion conversion mechanism may comprise a rack and pinion drive. The rack and pinion drive may comprise a pinion coupled to the output of the speed reduction gearing and a rack engaged with the pinion. A motion conversion mechanism which includes the rack and pinion drive has a simple construction.

The pinion may be rotatably mounted on the support. The rack may be fixed to the adjusting member.

The rack and pinion drive may comprise a further pinion coupled to the output of the speed reduction gearing, and a further rack engaged with the further pinion.

The rack and the further rack may extend along a displacement direction of the adjusting member and may be offset from each other transverse to the displacement direction.

The pinion and, if provided, the further pinion may be arranged in a pinion housing. The rack and, if provided, the further rack may be configured to extend through the pinion housing.

The speed reduction gearing may comprise at least one worm reduction gearing. The speed reduction gearing may comprise a two-stage worm reduction gearing. The speed reduction gearing may comprise a first worm attached to an output shaft of the power drive in a torque-proof manner. The speed reduction gearing may comprise a first worm wheel which is in engagement with the first worm. A rotation axis of the first worm wheel may be transverse to a rotation axis of the first worm. The speed reduction gearing may comprise a second worm which is integrally formed with the first worm wheel or otherwise attached to the first worm wheel in a torque-proof manner. A rotation axis of the second worm may coincide with the rotation axis of the first worm wheel. The speed reduction gearing may comprise a second worm wheel which is in engagement with the second worm. A rotation axis of the second worm wheel may be transverse to a rotation axis of the second worm. The second worm wheel may form an output of the speed reduction gearing. Such a speed reduction gearing provides a speed reduction and torque increase suitable for adjusting a seat cushion length while providing a compact design.

The first worm, the first worm wheel, the second worm, and the second worm wheel may all be rotatably mounted in a housing of the actuator.

The actuator may comprise a housing in which the power drive and the speed reduction gearing are mounted. The housing may be rigidly attached to the support.

In the installed state of the seat cushion length adjusting device, the housing of the actuator may be mounted so as to remain stationary relative to a seat pan of the seat.

The seat cushion length adjusting device may be a modular unit configured for attachment to a seat pan of a seat. The seat cushion length adjusting device may be configured such that the motion conversion mechanism is not directly attached to the seat pan.

The seat cushion length adjusting device may be configured such that only the support is affixed to the seat pan of the seat using bolts, screws, or other attachment devices.

The seat cushion length adjusting device may comprise a seat cushion. The adjusting member may be attached to a portion of the seat cushion to linearly displace the portion of the seat cushion. The seat cushion may be resiliently deformable and/or at least a portion of the seat cushion may be displaceable under the action of the seat cushion length adjusting device. The seat cushion may comprise a resilient cover, which may be a woven or non-woven fabric, and a backing material. The backing material may have a major face. The backing material may be configured to elastically deform when a load is applied in a direction normal to the major face. The backing material may be configured to elastically deform when a load is applied by the seat cushion length adjusting device in a direction parallel to the major face. The backing material may be a foam, e.g. polyurethane (PU) foam. The backing material may comprise a fiber cushion which includes thermally activated bonding fibers and matrix fibers.

The seat cushion may be configured to reversibly deform when the seat cushion length adjusting device adjusts the length of the seat cushion.

The seat cushion may form a pocket in which at least a portion of the adjusting member is received.

The seat cushion length adjusting device may comprise a controller for controlling activation of the power drive. The controller may be a vehicle control unit. The controller may be configured to automatically control the motor to adjust the seat cushion length depending on which one of several authorized drivers sits on the seat. The controller may be configured to automatically identify a driver based on a vehicle authorization element used by the driver, e.g. based on a key or a keyless authorization element used by the driver.

The power drive may be an electric motor.

A direction of rotation of the electric motor may be reversible. The seat cushion length may then be selectively increased or decreased by controlling the rotation direction of the motor shaft. This can be done in various ways, e.g. by reversing a polarity of a power supplied to the electric motor or by providing a control signal to the electric motor which defines the rotation direction.

A vehicle seat according to an embodiment comprises a seat which has a seat cushion and a seat cushion length adjusting device according to an embodiment. The seat cushion length adjusting device is coupled to the seat cushion to adjust a length of the seat cushion.

The vehicle seat may be a car seat. The vehicle seat may be a lorry seat. The vehicle seat may be a public transportation seat, e.g. a seat for a bus, for a train, or for an airplane.

The actuator may be attached to a seat pan of the vehicle seat. The seat pan may support both the seat cushion length adjusting device and the seat cushion. At least the power drive and the speed reduction gearing of the seat cushion length adjusting device may be interposed between the seat pan and the seat cushion. The power drive and the speed reduction gearing may also be installed such that both the seat pan and the adjusting member are interposed between the power drive and the seat cushion.

The seat cushion length adjusting device may be configured to displace the adjusting member relative to the seat pan.

The vehicle seat may comprise a backrest.

According to another embodiment, a method of adjusting a length of a seat cushion is provided. The length is adjusted using an actuator which comprises a power drive, a speed reduction gearing having an input coupled to the power drive and an output, and a motion conversion mechanism for converting a rotational motion of the output of the speed reduction gearing into a linear motion. At least a portion of the seat cushion and the motion conversion mechanism are coupled to an adjusting member which is displaceably mounted to a support. The method comprises activating the power drive of the actuator to displace the adjusting member relative to the support.

Further features of the method and the effects respectively attained thereby may correspond to the features explained with reference to the seat cushion length adjusting device and of the vehicle seat according to embodiments.

The method may be performed using the seat cushion length adjusting device of any one of the various embodiments disclosed herein.

According to another embodiment, a method of mounting a seat cushion length adjusting device according to an embodiment to a seat is provided. The method comprises mounting a housing in which the power drive and the speed reduction gearing are housed to a seat pan or another structural member of the seat.

The method may comprise arranging the support in a recess formed in the seat pan, and affixing the support to the seat pan.

The devices and methods according to various embodiments may be utilized for adjusting a length of a seat cushion. The devices and methods according to the various embodiments may be used for adjusting a length of a seat cushion of a vehicle seat, in particular of an automotive vehicle seat.

BRIEF DESCRIPTION OF THE SEVERAL VIEWS OF THE DRAWINGS

Additional features and advantages of the invention will become more readily appreciated from the following detailed description of preferred or advantageous embodiments with reference to the accompanying drawings in which like or identical reference numerals indicate like or identical elements.

DESCRIPTION OF EMBODIMENTS

Figure 1:
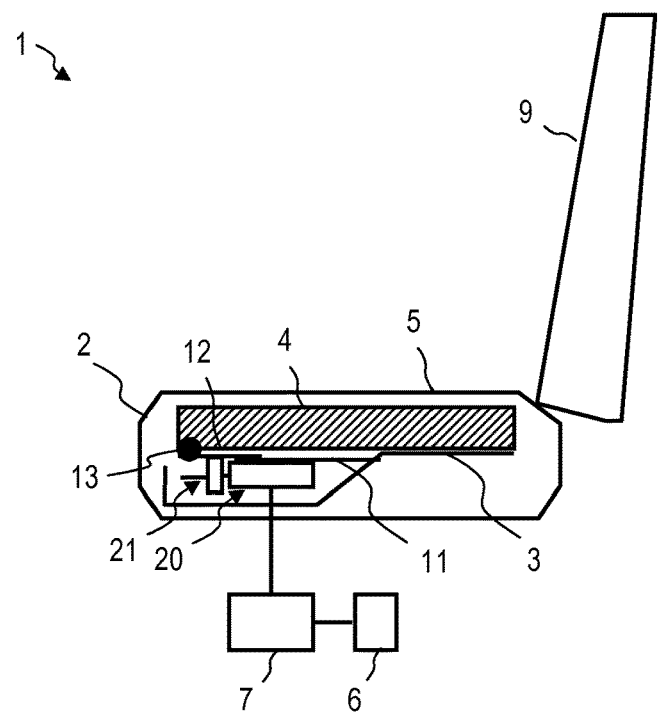
FIG. 1 is a schematic cross-sectional view of a seat according to an embodiment.

Exemplary embodiments of the invention will now be described with reference to the drawings. While some embodiments will be described in the context of specific fields of application, such as in the context of automotive vehicle seating, the embodiments are not limited to this field of application. The features of the various embodiments may be combined with each other unless specifically stated otherwise. In the drawings, like reference numerals refer to like elements.

FIG. 1 is a schematic view of a vehicle seat 1 according to an embodiment. The vehicle seat 1 may be configured as a car seat or another automotive vehicle seat.

The vehicle seat 1 generally comprises a seat 2 and a backrest 9. The seat 2 may comprise a structural member which provides structural stability to the seat 2. The structural member may be a seat pan 3 and/or a seat frame. The seat 2 comprises a seat cushion. The seat cushion may comprise a cover 5. The cover 5 may be formed from a woven or non-woven fabric. The seat cushion may comprise a resilient backing 4, which provides enhanced comfort. The resilient backing 4 may be upholstery. The resilient backing 4 may be made of or may comprise a foam material or a fiber material, for example. The cover 5 is reversibly deformable when a seat cushion length adjusting device extends or reduces a length of the seat cushion. The resilient backing 4 may be resiliently deformed and/or at least a portion of the resilient backing 4 may be displaced relative to the cover 5 when the seat cushion length is adjusted.

The vehicle seat 1 includes the seat cushion length adjusting device which is coupled to the seat cushion to adjust a length of the seat cushion. The seat cushion length adjusting device is installed in a cavity defined within the seat 2 and is operative to modify an exterior shape of the vehicle seat 1 by reversibly changing a length of the seat cushion. The length of the seat cushion upon which the thighs of the seat occupant may rest can thereby.

The adjustment of the seat cushion length may be implemented in various ways using the seat cushion length adjusting device. For illustration, the cover 5 and the resilient backing 4 may be deformed elastically under the action of the seat cushion length adjusting device. Alternatively or additionally, the resilient backing 4 may be displaced within the seat under the action of the seat cushion length adjusting device. Alternatively or additionally, the resilient backing 4 may have at least two portions which are displaceable relative to one another, and the seat cushion length adjusting device 4 may be configured to displace one of the portions of the resilient backing 4 relative to another one of the portions of the resilient backing 4. The seat cushion length adjusting device may be configured to adjust a distance between two opposing peripheral edges of the seat cushion.

As will be explained in more detail below, the seat cushion length adjusting device generally includes a support 11 and an adjusting member 12 which is displaceably relative to the support 11. The adjusting member 12 may be mounted on the support 11 so as to be displaceably in a translatory manner relative to the support 11. The support 11 may be a section of the seat pan 3, may be integrally formed with the seat pan 11 or may be affixed to the seat pan 3 such as by bolts, screws or other attachment techniques.

The seat cushion length adjusting device includes a power drive and speed reduction gearing assembly 20. The power drive and the speed reduction gearing may be housed in a housing which may be affixed to the support 11 or which may be integrally formed with the support 11. The power drive may be an electric motor. The power drive may be a rotary motor having a motor shaft extending from the motor as an output shaft. The speed reduction gearing may have an input coupled to the motor shaft and may have an output. The speed reduction gearing may provide a speed reduction, e.g. a reduction of angular velocity of the output compare to angular velocity of the input, and a torque increase.

The seat cushion length adjusting device includes a rotary to linear motion conversion mechanism 21. The motion conversion mechanism 21 is operative to convert a rotational motion of the output of the speed reduction gearing into a translatory displacement of the adjusting member 12. The motion conversion mechanism 21 may have any one of various configurations. The motion conversion mechanism 21 may comprise a spindle drive having a spindle and a spindle nut in threading engagement with the spindle. The motion conversion mechanism 21 may comprise a rack and pinion drive.

The adjusting member 12 is coupled to the seat cushion. Any one of various coupling mechanisms may be used. A front portion of the adjusting member 12 may be received in a pocket defined by the seat cushion to implement a coupling structure 13 which couples the adjusting member 12 to the front end of the seat cushion. Alternatively or additionally, the adjusting member 12 may be attached to the front portion of the seat cushion by means of one or several attachment techniques which form the coupling structure 13, e.g. by bolts, screws, rivets, adhesive, welding, or other techniques.

Activation of the power drive of the seat cushion length adjusting device causes the adjusting member 12 to be displaced relative to the support 11. The adjusting member 12 is displaced relative to a rear end of the seat 2 and/or relative to the backrest 9. For a vehicle seat 1 installed in a vehicle, the adjusting member 12 is displaced relative to the seat pan, while activation of the power drive of the seat cushion length adjusting device does not cause any displacement of the seat pan relative to the vehicle floor, for example.

Figure 2:
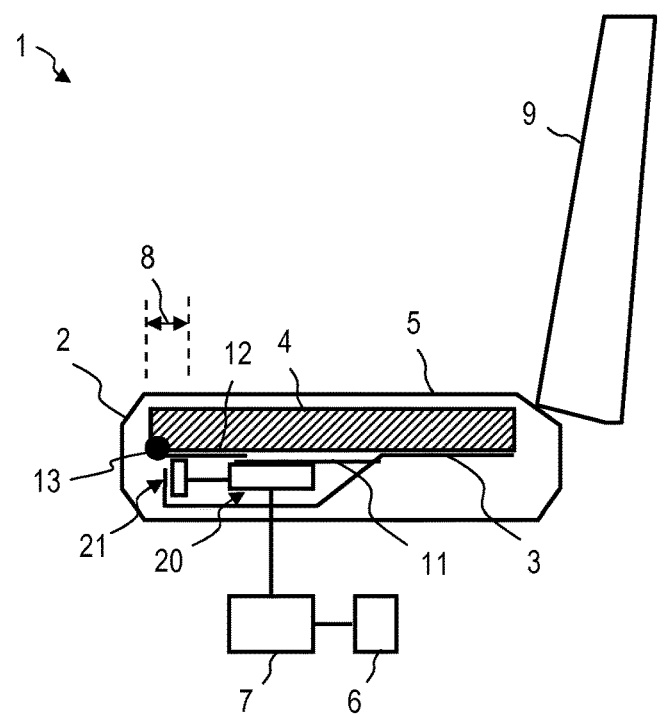
FIG. 2 is a schematic cross-sectional view of the seat of FIG. 1.

By activating the power drive of the seat cushion length adjusting device, the length of the seat cushion may be altered by an increment or decrement 8, depending on the rotation direction of the motor shaft. By controlling the power drive such that the motor shaft rotates in a first direction, the length of the seat cushion may be increased by an increment 8, as illustrated in FIG. 2. By operating the power drive such that the motor shaft rotates in a second direction opposite to the first direction, the length of the seat cushion may be decreased. The shape of the seat 2 and, in particular, the length of the seat cushion may thereby be adjusted to accommodate various passenger sizes and various thigh lengths or sitting positions.

As illustrated in FIG. 2, activation of the power drive of the seat cushion length adjusting device may displace a front end of the seat cushion in a forward direction by a distance 8. The length of the seat cushion and the external shape of the seat 2 may thereby be changed. When the power drive is activated such that an output shaft of the power drive rotates in the reverse direction, the front end of the seat cushion may be displaced in a rearward direction under the action of the seat cushion length adjusting device.

A controller 7 may control operation of the actuator. The controller 7 may be coupled to the actuator through an electrical connection. The controller 7 may control the voltage applied at the electrical connection to thereby control activation of the actuator. The controller 7 may control a polarity of the voltage supplied to the electric motor. The control may be performed in different ways. A user interface 6 may be provided which is coupled to the controller 7, so as to allow a user to effect an adjustment of the seat cushion length under the control of a user action. Alternatively or additionally, the controller 7 may automatically control the actuator when a certain driver is recognized to thereby set the seat cushion length to a value which is suitable for the respective driver. An identification of a suitable seat cushion length may be automatically performed based on an identifier stored in a vehicle authorization element (vehicle key or corresponding key-like element) and a look-up table which stores seat cushion lengths for various identifiers. The controller 7 may automatically set the configuration of the seat cushion length by activating the actuator, when required, when the identifier is read from the vehicle authorization element. The controller 7 may include a memory which stores a present position of the actuator of the seat cushion length adjusting device. Alternatively or additionally, the controller 7 may automatically control the actuator in response to a critical event, such as a collision.

With reference to FIG. 3 to FIG. 14, configurations of seat cushion length adjusting devices according to embodiments will be described in detail. The seat cushion length adjusting devices may be used in the vehicle seat 1 of an embodiment.

Generally, the actuator of the seat cushion length adjusting device includes a power drive and a speed reduction gearing. The speed reduction gearing has an output which drives a rotational to linear motion conversion mechanism. The speed reduction gearing may be a self-locking gearing. Alternatively or additionally, the rotational to linear motion conversion mechanism may be self-locking. This ensures that the seat cushion length may remain at the set position even when the power drive is no longer activated.

Figure 3:
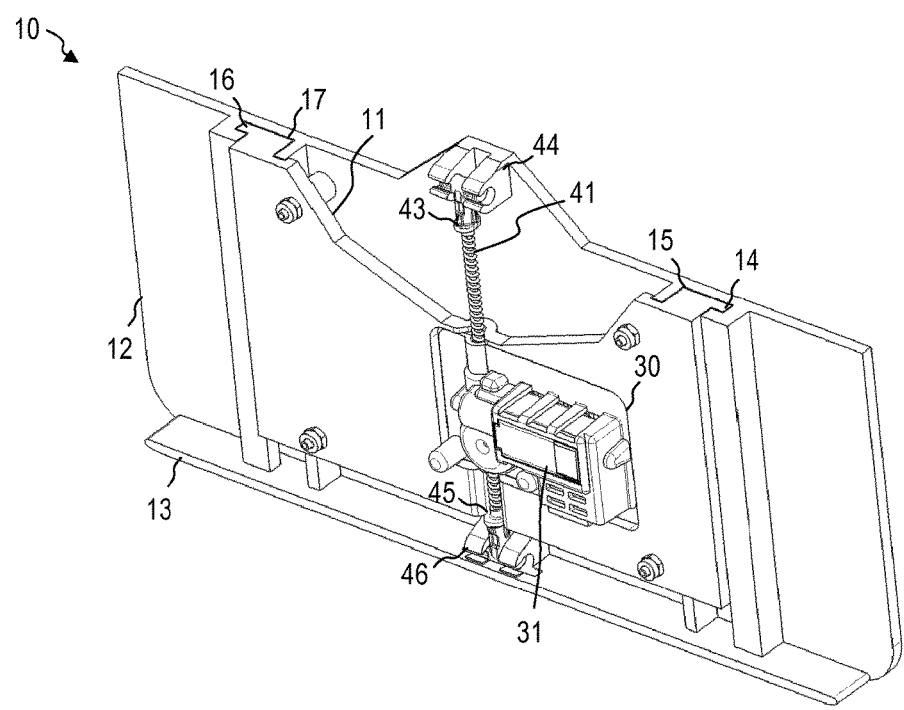
FIG. 3 is a perspective view of a seat cushion length adjusting device according to an embodiment.

FIG. 3 is a perspective view of a seat cushion length adjusting device 10 according to an embodiment. The seat cushion length adjusting device 10 is a modular unit which may be pre-fabricated and which may be installed to the seat pan 3 as one unit. The seat cushion length adjusting device 10 may be configured such that only the support 11 must be affixed to the seat pan 3, while no connections must be established between the other components of the seat cushion length adjusting device 10 and the seat pan 3.

The seat cushion length adjusting device 10 includes a support 11. The seat cushion length adjusting device 10 includes an adjusting member 12 which is displaceably supported on the support 11. Guide features 14-17 may be provided on the support 11 and/or the adjusting member 12 to guide a translatory linear displacement of the adjusting member 12 relative to the support 11. For illustration, the adjusting member 12 may be guided on the support 11 so as to be slidable on the support 11 in the forward-rearward direction. The support 11 may have a projection 14, 16 which is slidably received in a mating recess 15, 17 of the adjusting member 12. Alternatively or additionally, the support 11 may have a recess in which a mating projection of the adjusting member 12 is slidably received. The projection 14, 16 and the recess 15, 17 may extend in a direction which corresponds to the forward-rearward direction of the seat. The direction along which the guide features extend may define a displacement direction for displacing the adjusting member 12, which corresponds to the direction in which the length of the seat cushion is adjusted.

The seat cushion length adjusting device 10 includes a housing 30 in which the power drive 31 is housed. The speed reduction gearing coupled between a motor shaft of the power drive 31 and the motion conversion mechanism may also be housed in the housing 30. The speed reduction gearing may have any one of various configurations. The speed reduction gearing may be a worm reduction gearing. The speed reduction gearing may be a two-stage worm reduction gearing, as will be explained in more detail with reference to FIG. 4. The speed reduction gearing may have more than two speed reduction stages.

The motion conversion mechanism of the seat cushion length adjusting device 10 is operative to convert a rotation of an output of the speed reduction gearing into a linear displacement of the adjusting member 12 relative to the support 11. The motion conversion mechanism may be a spindle drive, for example. The spindle drive includes a spindle 41 and a spindle nut 42 in threading engagement with the spindle 41. The spindle 41 and the spindle nut 42 may have a longitudinal axis. One of the spindle 41 and the spindle nut 42 may be mounted such that it is rotatable about a longitudinal axis of the spindle 41. The other one of the spindle 41 and the spindle nut 42 may be mounted such that it is not rotatable about the longitudinal axis of the spindle 41.

In the seat cushion length adjusting device 10 of FIG. 3, the spindle 41 is mounted such that it is prevented from rotating. The spindle 41 is attached to the adjusting member 12 in a manner which prevents the spindle 41 from rotating about its longitudinal axis. It is understood that torsion may cause the spindle 41 to flex to a certain degree. However, the spindle 41 is generally secured to the adjusting member 12 in such a way that it cannot perform full rotations about its longitudinal axis.

The spindle nut 42 is rotatably mounted in the housing 30. The spindle nut 42 is rotatable relative to the support 11. Rotation of the spindle nut 42 causes the spindle 41 to be displaced relative to the housing 30. The attachment of the spindle 41 to the adjusting member 12 causes the adjusting member 12 to slide along the support 11 as the spindle 41 is displaced through the spindle nut 42 by rotation of the spindle nut 42.

The spindle 41 may be mounted in various ways. In the seat cushion length adjusting device 10 of FIG. 3, the spindle 41 has an end stop 43 which has an attachment feature received in a mating attachment feature 44 of the adjusting member 12. The attachment feature formed on the end stop 43 may include an axle which extends transverse to the longitudinal axis of the spindle 41 and which allows the spindle to deflect under loads, thereby causing the end stop 43 to pivot within the attachment feature 44 of the adjusting member 12.

The end stop 43 may also be configured to limit travel of the adjusting member 12 relative to the support 11. The end stop 43 may have an abutment surface. Abutment of the support 11 or of the housing 30 on the abutment surface of the end stop 43 may stop the linear displacement of the adjusting member 12 relative to the support 11.

The end stop 43 may be formed of plastic. The end stop 43 may be molded onto an end of the spindle 41. The end stop 43 may be formed by injection molding, for example.

The opposite end of the spindle 41 may also be attached to the adjusting member 12. The spindle 41 has a further end stop 45 which has an attachment feature received in a mating attachment feature 46 of the adjusting member 12. The attachment feature formed on the further end stop 45 may include an axle which extends transverse to the longitudinal axis of the spindle 41 and which allows the spindle to deflect under loads, thereby causing the further end stop 45 to pivot within the attachment feature 46 of the adjusting member 12. The further end stop 45 may also be configured to limit travel of the adjusting member 12 relative to the support 11. The further end stop 45 may have an abutment surface. Abutment of the support 11 or of the housing 30 on the abutment surface of the further end stop 45 may stop the linear displacement of the adjusting member 12 relative to the support 11.

The further end stop 45 may be formed of plastic. The further end stop 45 may be molded onto a further end of the spindle 41. The further end stop 45 may be formed by injection molding, for example. The end stop 43 and the further end stop 45 may be molded onto the spindle 41 in the same injection molding process.

The distance between the end stop 43 and the further end stop 45 may define the travel path of the adjusting member 12 relative to the support 11. Accordingly, the maximum change in length of the seat cushion may be adapted in a simple manner to different customer needs. For illustration, the length of the end stop 43 and of the further end stop 45 may be set in an overmolding process to define different maximum displacements between the adjusting member 12 and the support 11, in accordance with the travel distance required by a specific customer.

In operation of the seat cushion length adjusting device 10, rotation of the motor shaft of the power drive causes the spindle nut 42 to rotate. The adjusting member 12 to which the spindle 41 is attached is displaced in a linear manner relative to the support 11. A coupling structure 13 of the adjusting member 12 which is attached or otherwise coupled to the seat cushion is displaced, effecting a change in the length of the seat cushion.

Figure 4:
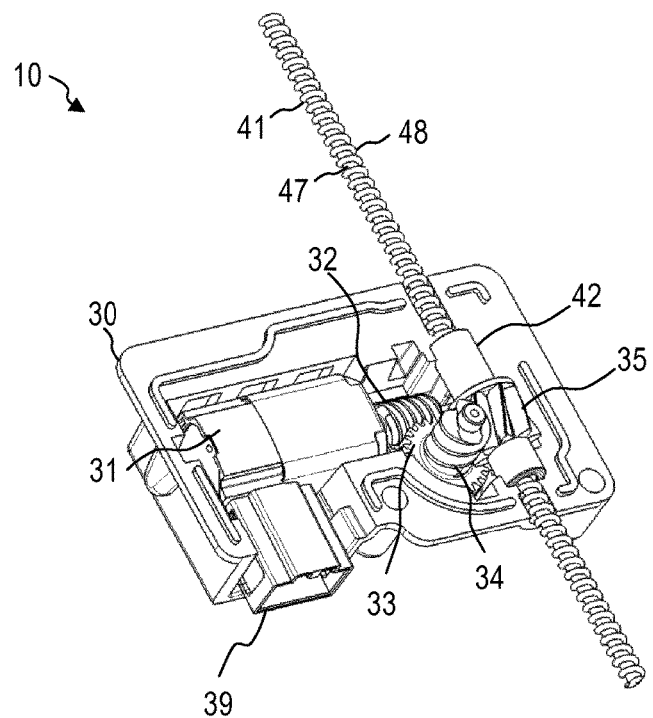
FIG. 4 is a partial view of the seat cushion length adjusting device of FIG. 3.

FIG. 4 is a partial perspective view of the actuator of the seat cushion length adjusting device 10. The configuration of the actuator will be explained in more detail with reference to FIG. 4.

The housing 30 includes a recess in which a power drive 31 configured as an electric motor is received. The housing 30 may define an opening through which a connector 39 of the motor may project. The connector 39 may be a connector fitting which is releasable from the power drive 31 in a reversible manner and/or which can be attached to the power drive 31 by pushing the connector 39 onto the power drive 31. This facilitates connection of the power drive 31 to different board networks, for example.

The housing includes at least one further recess for rotatably supporting at least one gear of the speed reduction gearing. In the seat cushion length adjusting device 10 of FIG. 4, the speed reduction gearing is implemented as a two-stage worm speed reduction gearing. The speed reduction gearing may comprise a first worm 32 attached to an output shaft of the power drive 31 in a torque-proof manner. The speed reduction gearing may comprise a first worm wheel 33 which is in meshing engagement with the first worm 32. A rotation axis of the first worm wheel 33 may be transverse to a rotation axis of the first worm 32. The speed reduction gearing may comprise a second worm 34 which is integrally formed with the first worm wheel 33 or which is otherwise attached to the first worm wheel 34 in a torque-proof manner. A rotation axis of the second worm 34 may coincide with the rotation axis of the first worm wheel 33. The speed reduction gearing may comprise a second worm wheel 35 which is in meshing engagement with the second worm 34. A rotation axis of the second worm wheel 35 may be transverse to a rotation axis of the second worm 34. The second worm wheel 35 may form an output of the speed reduction gearing. Such a speed reduction gearing provides a speed reduction and torque increase suitable for adjusting a seat cushion length while using a power drive with compact design. Such a speed reduction gearing can also provide self locking.

The output of the speed reduction gearing, which may be the second worm wheel 35, may be coupled to the spindle nut 42 in a torque-proof manner. The spindle nut 42 and the second worm wheel 35 may be integrally formed. The spindle nut 42 and the second worm wheel 35 may be integrally formed from a plastic material. The spindle nut 42 has an internal thread which has a pitch equal to a pitch of an external thread of the spindle 41.

The spindle 41 may be flexible. The spindle 41 may be a flexible shaft or flex-shaft which is provided with an external thread. The flexible spindle may have a metal core 47 comprising one metal wire or a cable including a plurality of metal wires. The flexible shaft may have an external thread. The flexible shaft may have a metal wire helix 48 on its outer surface for forming the external thread. Other implementations may be used. For illustration, a rigid spindle may also be used, as will be explained in more detail below. The spindle 41 may be configured such that it deforms elastically when axial loads less than an axial load of 1200 N are applied.

The spindle 41 which provides flexibility to deflect under loads applied normal to the longitudinal axis of the spindle 41 improves the durability of the seat cushion length adjusting device 10 and mitigates the risk of breakage under load conditions.

The seat cushion length adjusting device 10 is configured as a modular unit which may be pre-fabricated and which may be attached to the seat, e.g. by attaching the support 11 to the seat pan 3 by means of screws, bolts, rivets or other attachment techniques.

Figure 5:
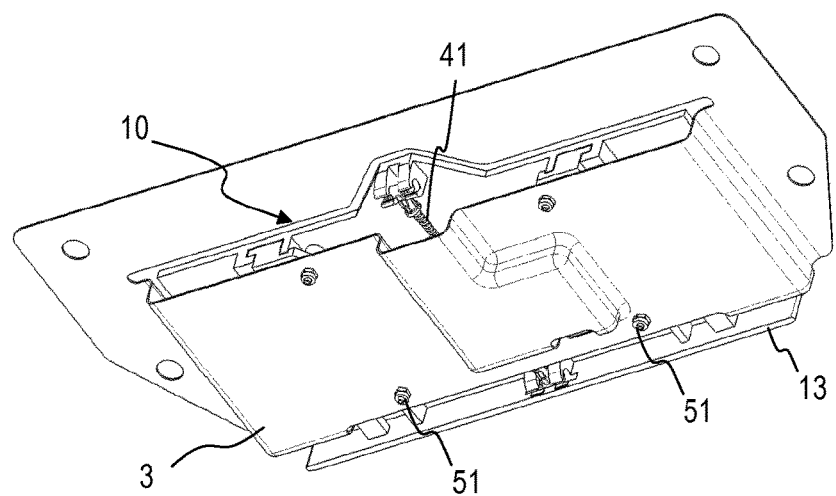
FIG. 5 is a view of the seat cushion length adjusting device of FIG. 3 in an installed state.

FIG. 5 illustrates the seat cushion length adjusting device 10 in a state in which it is attached to the seat pan 3. The seat pan 3 has a recess in which at least the support 11 of the seat cushion length adjusting device 10 may be disposed. The support 11 may be attached to the seat pan 3 by means of screws or bolts 51. An upper face of the seat pan 3 may have a cut-out in which the adjusting member 12 can be positioned. Activation of the seat cushion length adjusting device 10 causes the adjusting member 12 to slide on the support 11 so as to effectively extend the upper face of the seat pan 3.

It will be appreciated that the seat cushion length adjusting device 10 configured as a modular unit can be installed with moderate workload. Only one component, e.g. the support 11, must be attached to the seat pan 3 or another structural member of the seat 2. It is not required to separately mount the spindle 41 or the spindle nut 42 to the seat pan 3, for example.

Various modifications of the seat cushion length adjusting device 10 described in detail with reference to FIG. 3 to FIG. 5 may be implemented in other embodiments. For illustration, the spindle 41 may be attached to the adjusting member at only one of its ends while the opposite end remains free. The spindle 41 may be formed as a rigid spindle. The support 11 of the seat cushion length adjusting device 10 may be comprised by the seat pan 3, such that the housing 30 may be attached directly on the seat pan 3. While the seat cushion length adjusting device 10 of FIG. 3 to FIG. 5 includes a spindle which is rotationally fixed and a spindle nut which is rotatable, other configurations may include a rotatable spindle and a spindle nut which is rotationally fixed.

Figure 6:
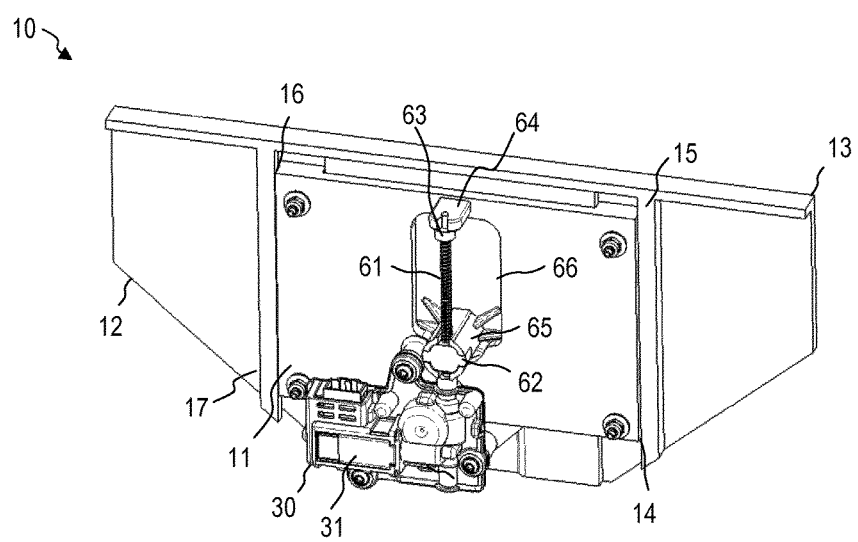
FIG. 6 is a perspective view of a seat cushion length adjusting device according to another embodiment.

FIG. 6 is a perspective view of a seat cushion length adjusting device 10 according to another embodiment. Elements or features which correspond to elements or features explained with reference to FIG. 3 to FIG. 5 are designated with the same reference numerals. The seat cushion length adjusting device 10 may be configured as a modular unit which may be pre-fabricated and which may be installed to the seat pan 3 as one unit. The seat cushion length adjusting device 10 may be configured such that only a support 11 must be affixed to the seat pan 3.

The seat cushion length adjusting device 10 includes the support 11 and an adjusting member 12 which is displaceably supported on the support 11. Guide features 14-17 may be implemented by ledges 15, 17 on the adjusting member 12 and mating guide faces 14, 16 on the support 11. For illustration, the ledges 15, 17 may be guided on outer periphery faces 14, 16 of the support 11.

The seat cushion length adjusting device 10 includes an actuator. The actuator comprises a power drive and a speed reduction gearing which may be configured as explained with reference to FIG. 3 to FIG. 5, for example.

The actuator of the seat cushion length adjusting device 10 further includes a motion conversion mechanism which is operative to convert a rotation of an output of the speed reduction gearing into a linear displacement of the adjusting member 12 relative to the support 11. The motion conversion mechanism may be a spindle drive. The spindle drive includes a spindle 61 and a spindle nut 62 in threading engagement with the spindle 61. The spindle 61 and the spindle nut 62 may have a longitudinal axis. The spindle 61 may be mounted such that it is rotatable about its longitudinal axis. The spindle nut 62 may be mounted such that it is not rotatable about the longitudinal axis of the spindle 61.

In the seat cushion length adjusting device 10 of FIG. 5, the spindle 61 is mounted such that it is rotatable. The spindle 61 may have an end which is rotatably supported on the support 11. The spindle 61 may have an end stop 63 which includes an attachment feature which is rotatably received in a mating attachment feature 64 of the support 11. An opposite end of the spindle 61 may be rotatably supported in the housing 30, as will be explained in more detail with reference to FIG. 8.

The end stop 63 may also be configured to limit travel of the adjusting member 12 relative to the support 11. The end stop 63 may have an abutment surface. Abutment of a projection 65 of the adjusting member 12 on the abutment surface of the end stop 63 may stop the linear displacement of the adjusting member 12 relative to the support 11.

The end stop 63 may be formed of plastic. The end stop 63 may be molded onto an end of the spindle 61. The end stop 63 may be formed by injection molding, for example.

The spindle nut 62 is attached to the adjusting member 12 in a manner which prevents the spindle nut 62 from rotating about a longitudinal axis of the spindle 61. The spindle nut 62 may be received in a projection 65 of the adjusting member 12. The projection 65 may project from the adjusting member 12 through an opening 66 in the support 11. The projection 65 may be shaped to allow the spindle 61 to pass therethrough. While the spindle nut 62 may be formed as a separate element which is inserted into the projection 65 for ease of installation, the spindle nut 62 and the projection 65 may also be integrally formed.

Rotation of the spindle 61 causes the spindle nut 62 to be displaced relative to the housing 30 along the longitudinal axis of the spindle 61. The attachment of the spindle nut 62 to the adjusting member 12 causes the adjusting member 12 to slide along the support 11 as the spindle nut 62 is displaced along the spindle 61 by rotation of the spindle 61.

Figure 7:
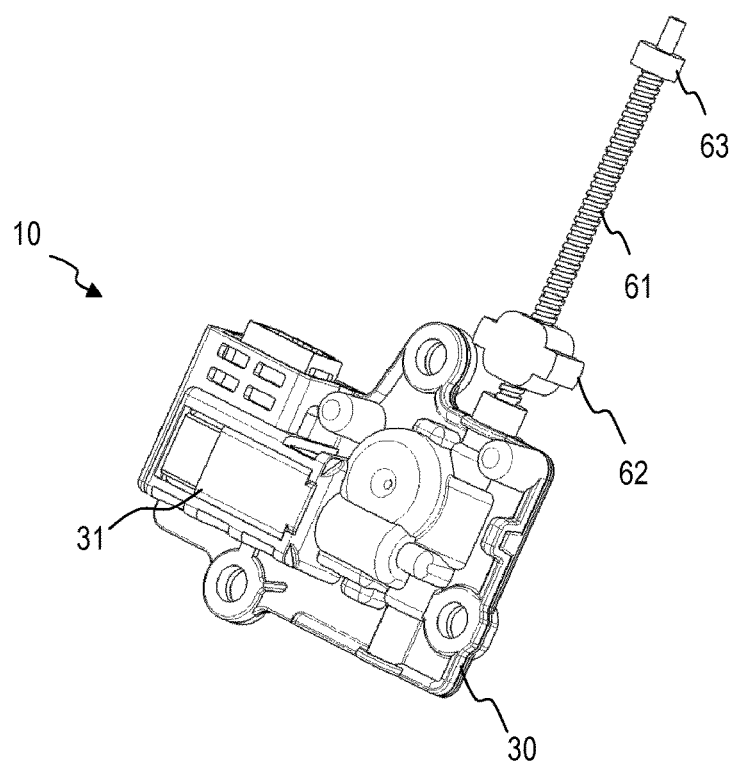
FIG. 7 is a partial view of the seat cushion length adjusting device of FIG. 6.
Figure 8:
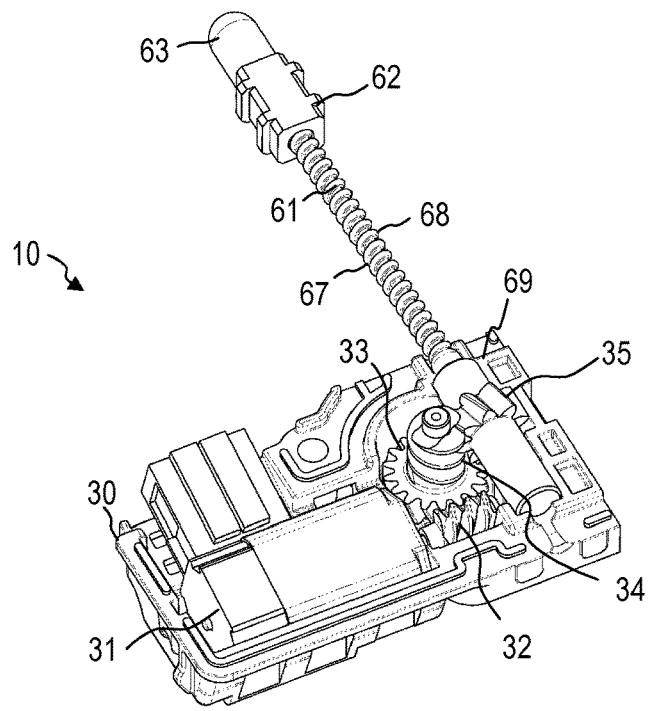
FIG. 8 is a partial view of the seat cushion length adjusting device of FIG. 6.

FIG. 7 is an enlarged view of the actuator of the seat cushion length adjusting device 10 of FIG. 6, and FIG. 8 is an enlarged view of an actuator for use in the seat cushion length adjusting device 10 of FIG. 6 which shows the speed reduction gearing.

The speed reduction gearing of the actuator may comprise at least one worm reduction gearing. The speed reduction gearing may comprise a two-stage worm reduction gearing, as explained with reference to FIG. 4. A speed reduction gearing having one reduction stage or having at least three reduction stages may also be used.

An output of the speed reduction gearing may be formed by a second worm wheel 35, for example. The output of the speed reduction gearing may be formed on an exterior surface of a sleeve 69. The sleeve 69 may be provided on a further end of the spindle 61 in a torque-proof manner. The sleeve 69 may be molded onto the further end of the spindle 61. The sleeve 69 may be formed from a plastic material. The sleeve 69 may be molded onto the further end of the spindle 61 by injection molding. The sleeve 69 with the second worm wheel 35 formed thereon and the end stop 63 may be molded onto the spindle 61 in the same injection molding process.

The spindle 61 may be configured in the same way as the spindle 41. The spindle 61 may be a flexible spindle. The spindle 61 may have a core 67 formed from one or several metal wires, and a wire helix 68 wound around the core 67. The spindle 61 may be configured such that it deforms elastically when axial loads less than an axial load of 1200 N are applied. The spindle 61 may be a rigid spindle.

The seat cushion length adjusting device 10 may be attached to the seat pan 3. The seat cushion length adjusting device 10 may be attached to the seat pan 3 as a modular unit, with only the support 11 being affixed to the seat pan by screw or bolts, for example. The support 11 may also be a section of the seat pan 3. In this case, the actuator of the seat cushion length adjusting device 10 may be mounted to the seat pan 3 in a two-stage process. The projection 65 of the adjusting member 12 is passed through the opening 66 in the seat pan and the spindle nut 62 is attached to the projection 65. The housing 30 may be attached to the seat pan 3.

Irrespective of whether the seat cushion length adjusting device 10 is a modular unit which can be mounted to the seat pan 3 by attaching the support 11 to the seat pan or whether other mounting techniques are used, at least a part of the seat cushion length adjusting device 10 may be disposed in a recess of the seat pan 3.

Figure 9:
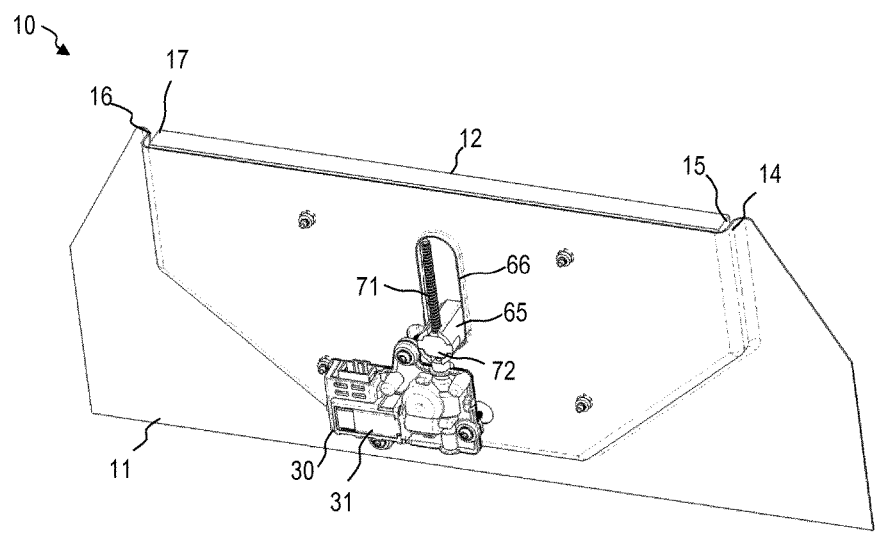
FIG. 9 is a perspective view of a seat cushion length adjusting device according to another embodiment.
Figure 10:
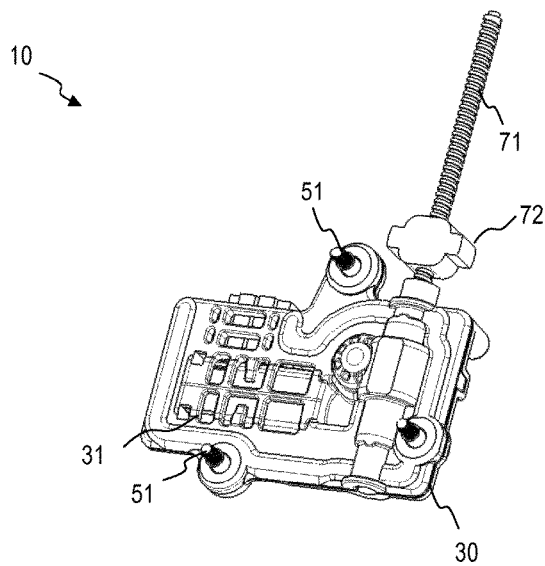
FIG. 10 is a partial view of the seat cushion length adjusting device of FIG. 9.

FIG. 9 and FIG. 10 show a seat cushion length adjusting device 10 according to another embodiment. In the seat cushion length adjusting device 10 of FIG. 9 and FIG. 10, the actuator includes a power drive and a speed reduction gearing which may be configured as explained with reference to FIG. 3 to FIG. 8. The motion conversion mechanism which converts a rotation of the output of the speed reduction gearing to a linear displacement of the adjusting member 12 relative to the support 11 may be a spindle drive which includes a spindle 71 and a spindle nut 72. Similarly to the seat cushion length adjusting device 10 of FIG. 6 to FIG. 8, the spindle nut 72 may be attached to the adjusting member 12 so as to be secured against rotation relative to a longitudinal axis of the spindle 71.

The spindle 71 is rotatably mounted. The spindle 71 has a free end. The spindle 71 may be formed as a rigid spindle. The spindle 71 may be formed from a unitary material, e.g. as a threaded bolt. A further end of the spindle 71 which is opposite to the free end may have an overmolded sleeve 69, as explained with reference to FIG. 8.

In operation of the seat cushion length adjusting device 10 of FIG. 9 and FIG. 10, rotation of a motor shaft of the power drive 31 causes the spindle 71 to rotate. The spindle nut 72 is displaced along the longitudinal axis of the spindle 71.

The support 11 of the seat cushion length adjusting device 10 of FIG. 9 and FIG. 10 may be formed by a section of the seat pan. The seat pan may have a recess in which the adjusting member 12 is slidably received. Lateral sides 14, 16 of the recess may act as guides for lateral sides 15, 17 of the adjusting member 12. An opening 66 in the seat pan may extend along the spindle 71. A projection 65 of the adjusting member 12 may project through the opening 66 and may secure the spindle nut 72 against rotation.

The actuator may be attached to the seat pan 3. The actuator of the seat cushion length adjusting device 10 may be mounted to the seat pan 3 in a two-stage process. The projection 65 of the adjusting member 12 is passed through the opening 66 in the seat pan and the spindle nut 62 is attached to the projection 65. The housing 30 may be attached to the seat pan 3 using bolts or screws 51 or other fastening techniques.

The rotational to linear motion conversion mechanism does not need to be implemented as a spindle drive, but may have any one of a wide variety of other implementations. For illustration, a rack and pinion drive may be used, as will be explained with reference to FIG. 11 to FIG. 14.

Figure 11:
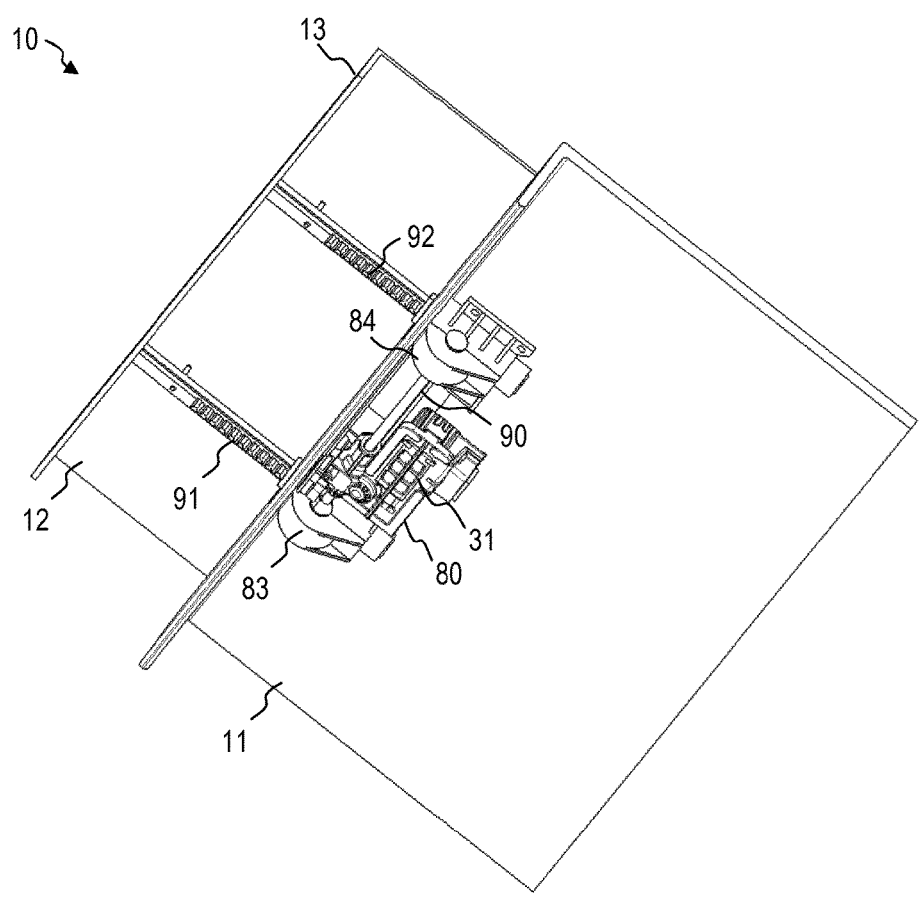
FIG. 11 is a perspective view of a seat cushion length adjusting device according to another embodiment.
Figure 12:
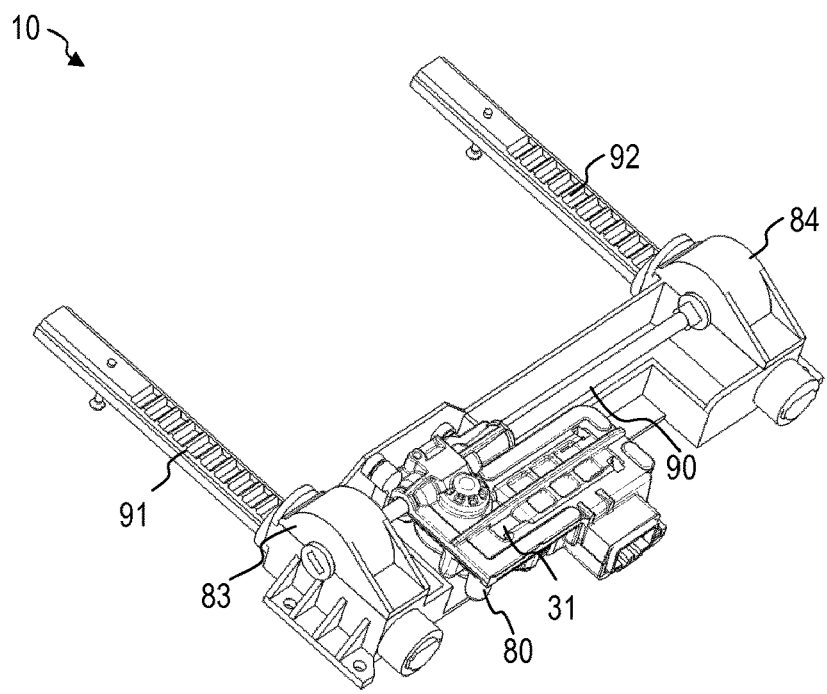
FIG. 12 is a partial view of the seat cushion length adjusting device of FIG. 11.
Figure 13:
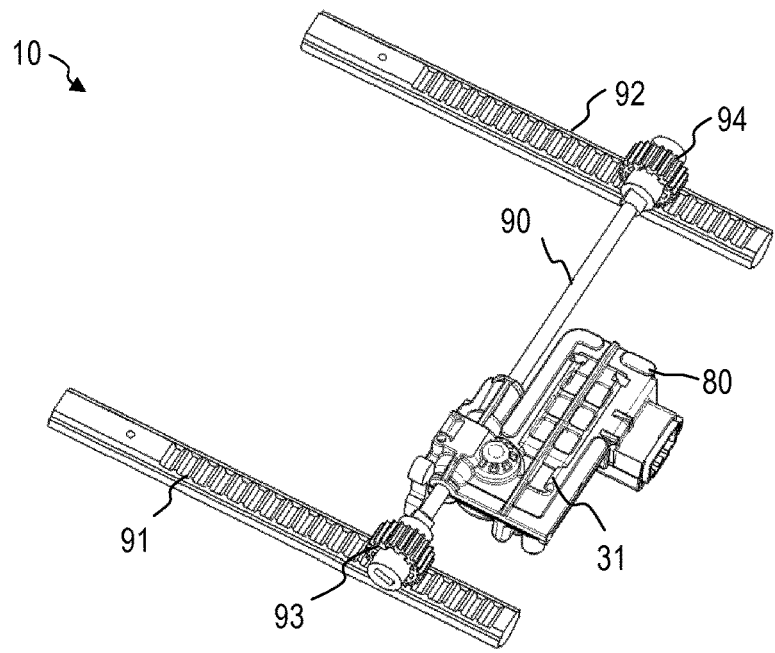
FIG. 13 is a partial view of the seat cushion length adjusting device of FIG. 11.
Figure 14:
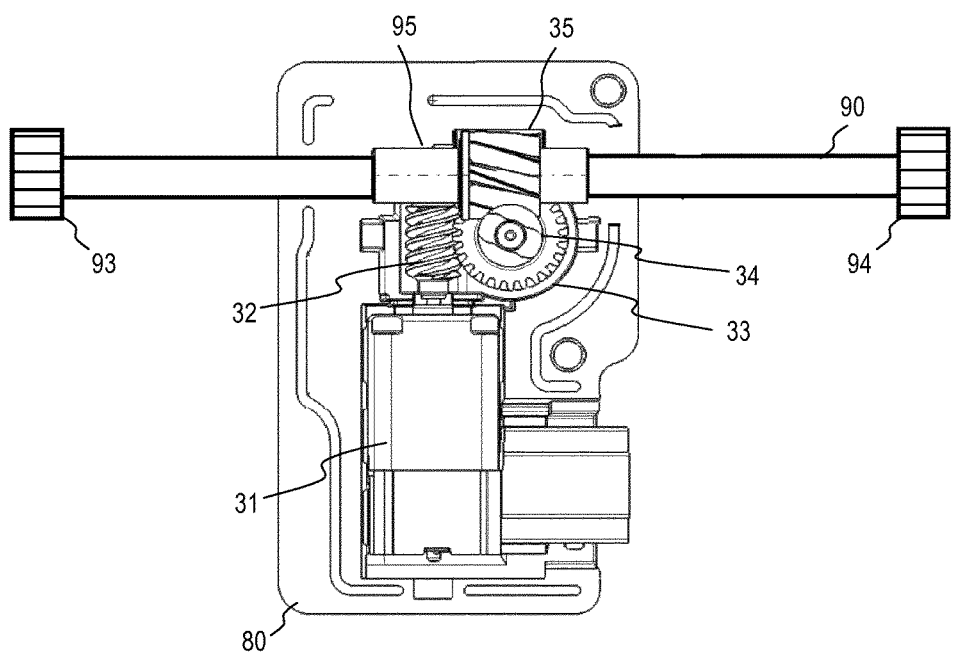
FIG. 14 is a partial view of an actuator for the seat cushion length adjusting device of FIG. 11.

FIG. 11 is a perspective view of a seat cushion length adjusting device 10 according to another embodiment. FIG. 12 and FIG. 13 are partial detail views of the seat cushion length adjusting device 10. FIG. 14 is a partial detail view of an actuator which may be used in the seat cushion length adjusting device 10. The seat cushion length adjusting device 10 includes a support 11, which may be configured for attachment to the seat pan 3 or which may comprise a portion of the seat pan 3. The seat cushion length adjusting device 10 includes an adjusting member 12 having a coupling section 13 for coupling the adjusting member 12 to a front end of the seat cushion.

The seat cushion length adjusting device 10 includes an actuator which has a power drive 31 arranged in a housing 80. The housing may be attached to the support 11. The actuator includes a speed reduction gearing. An output of the speed reduction gearing drives a pinion 93. The pinion 93 may be arranged in a pinion housing 83. The pinion 93 may be attached to a shaft 90 or may be formed integrally with the shaft. The pinion 93 has external teeth in engagement with a rack 91. The rack 91 may be attached to the adjusting member 12. The shaft 90 may be coupled to the output of the speed reduction gearing in a torque-proof manner, as will be explained in more detail with reference to FIG. 14.

The rack and pinion drive may include a further rack 92 and a further pinion 94 in engagement with the further rack 92. The further rack 92 may be attached to the adjusting member 12. The rack 91 and the further rack 92 may be parallel to each other. The rack 91 and the further rack 92 may be offset from each other in a direction transverse to a longitudinal direction of the rack 91 and the further rack 92. The further pinion 94 may be arranged in a further pinion housing 84, which may be formed integrally with the housing 82. The pinion 93 and the further pinion 94 may have a distance which is larger than a maximum dimension of the housing 80 which houses the power drive and the speed reduction gearing.

In operation of the seat cushion length adjusting device 10, rotation of the motor shaft of the power drive 31 causes the shaft 90 to rotate. The pinion 91 and the further pinion 93 rotate jointly with the shaft 90, causing a linear displacement of the rack 91 and the further rack 92. The adjusting member 12 to which the rack 91 and the further rack 92 are attached moves relative to the support 11.

FIG. 14 shows a partial plan view of an actuator which may be used in the seat cushion length adjusting device 10 of FIG. 10. The actuator includes a power drive 31 arranged in the housing 80. The actuator includes a speed reduction gearing. The speed reduction gearing may have at least one worm reduction gearing. The speed reduction gearing may be a two-stage worm reduction gearing configured as explained in detail with reference to FIG. 4. An output of the speed reduction gearing, which may be formed by the second worm wheel 35, is coupled to the shaft 90 in a torque-proof manner. The second worm wheel 35 may be integrally formed with a center portion 95 of the shaft 90. The second worm wheel 35 may be formed on a sleeve 95 which may be molded onto the shaft 90. The portion 95 with the second worm wheel 35 may be formed from plastic and may be formed by injection molding, for example.

Various modifications of the seat cushion length adjusting device 10 of FIG. 11 to FIG. 14 may be implemented in other embodiments. For illustration, the rack and pinion drive may have only one rack and only one pinion engaged with the rack. The rack and pinion drive may have more than two racks and more than two pinions engaged therewith.

According to embodiments, an adjustment of a length of a seat cushion is effected using an actuator which is housed within the seat. The actuator may have a speed reduction gearing with at least two speed reductions stages, e.g. a first worm reduction gearing and a second worm reduction gearing. The rotational movement is converted into a linear movement using a spindle drive, a rack and pinion drive, or another rotational to linear motion conversion mechanism.

While embodiments of the invention have been described with reference to the drawings, various modifications may be implemented in further embodiments. For illustration, while an actuator has been described in which a two-stage worm reduction gearing is coupled between the rotary motor shaft of an electric motor and the rotational to linear motion conversion mechanism, in other embodiments the speed reduction gearing may comprise only one or at least three worm reduction gearing stages. In other embodiments, another speed reduction gearing may be provided.

In each one of the various embodiments, the seat cushion length adjusting device may not only be used for displacing a front end of a seat cushion in a forward and rearward direction. The seat cushion length adjusting device may be coupled to a rear end of the seat cushion to effect the length change at the rear end of the seat cushion, for example. The seat cushion length adjusting device may be coupled to at least one lateral side of the seat cushion to effect the length change at the lateral side.

The adjustment mechanism of embodiments may also be combined with other mechanisms which are located within the seat. For illustration, adjustable side bolsters or a ventilation mechanism may be integrated into the seat.

While the actuator of the seat cushion length adjusting device may be mounted to a seat pan of a vehicle seat, the actuator may be mounted to any other structural component of the vehicle seat.

Further, while embodiments have been described in which the actuator is mounted such that the power drive and the speed reduction gearing are provided so as to remain stationary relative to a seat frame while the adjusting member moves relative to the seat frame, other configurations may be used in other embodiments. In particular, the housing with the power drive and the speed reduction gearing housed therein may be mounted to the adjusting member so as to be displaced relative to the seat frame jointly with the adjusting member. In this case, the rotationally fixed component of a spindle drive or the rack of the rack and pinion drive is provided on the support, which remains stationary.

It will be appreciated that various technical effects can be attained using the seat cushion length adjusting devices and methods of embodiments. The actuator has a compact construction, which allows it to be integrated a cavity of the seat which has small dimensions, for example. The speed reduction gearing allows compact electric motors to be used. A low weight and inexpensive construction may be realized.

The seat cushion length adjusting devices of some embodiments provide a modular configuration which allows the seat cushion length adjusting device to be easily integrated into a seat. The actuator can be easily adapted to various adjustment speeds and adjustment forces. For illustration, the speed reduction gearing between the output shaft of the motor and the spindle reduction gearing may be adjusted depending on customer needs. Alternatively or additionally, the adjustment travel may be adapted. This can be done easily by suitably positioning the end stops on the spindle(s) of the actuator.

While exemplary embodiments have been described in the context of a vehicle seat, embodiments of the invention are not limited to this particular field of application. Rather, embodiments of the invention may be advantageously employed to adjust a length of a seat cushion in a wide variety of seats.

The invention claimed is:

1. A seat cushion length adjusting device comprising:
   a support;
   an adjusting member displaceably mounted to the support and configured for coupling to at least a portion of a seat cushion; and
   an actuator coupled to the support and the adjusting member, the actuator configured to displace the adjusting member relative to the support, the actuator including
      a power drive,
      a speed reduction gearing having an input coupled to the power drive and an output, and a motion conversion mechanism for converting a rotational motion of the output of the speed reduction gearing into a linear displacement between the adjusting member and the support, wherein the motion conversion mechanism comprises a spindle drive, the spindle drive comprising a spindle having an external thread and a spindle nut having an internal thread engaged with the external thread of the spindle, wherein the spindle is a flexible spindle.

2. The seat cushion length adjusting device of claim 1, wherein the spindle comprises
   a core and
   a wire helix wound about the core to form the external thread.

3. The seat cushion length adjusting device of claim 2, wherein the core comprises a cable formed from a plurality of metal wires.

4. The seat cushion length adjusting device of claim 1, wherein one of the spindle or the spindle nut is mounted to the adjusting member so as to be secured against rotation.

5. The seat cushion length adjusting device of claim 4, wherein the other one of the spindle or the spindle nut is coupled to the output of the speed reduction gearing and is rotatably mounted.

6. The seat cushion length adjusting device of claim 1, wherein the spindle comprises an end stop molded onto the spindle.

7. The seat cushion length adjusting device of claim 1, wherein the motion conversion mechanism comprises a rack and pinion drive, the rack and pinion drive comprising:
   a pinion coupled to the output of the speed reduction gearing, and
   a rack engaged with the pinion.

8. The seat cushion length adjusting device of claim 1, wherein the speed reduction gearing comprises at least one worm reduction gearing.

9. The seat cushion length adjusting device of claim 1, wherein the actuator comprises a housing in which the power drive and the speed reduction gearing are mounted,
wherein the housing is rigidly attached to the support.

10. A vehicle seat, comprising:
a seat comprising a seat cushion, and
the seat cushion length adjusting device of claim 1, wherein the adjusting member is coupled to the seat cushion to adjust a length of the seat cushion.

11. The vehicle seat of claim 10,
wherein the actuator is mounted to a seat pan of the vehicle seat, and
wherein the seat cushion length adjusting device is configured to displace the adjusting member relative to the seat pan.

12. A method of adjusting a length of a seat cushion using an actuator which comprises a power drive, a speed reduction gearing having an input coupled to the power drive and an output, and a motion conversion mechanism for converting a rotational motion of the output of the speed reduction gearing into a linear motion, wherein the motion conversion mechanism comprises a spindle drive, the spindle drive comprising a spindle having an external thread and a spindle nut having an internal thread engaged with the external thread of the spindle, and wherein the spindle is a flexible spindle, wherein at least a portion of the seat cushion and the motion conversion mechanism are coupled to an adjusting member which is displaceably mounted to a support, wherein the method comprises:
   activating the power drive of the actuator to displace the adjusting member relative to the support.

* * * * *